UNITED STATES PATENT OFFICE.

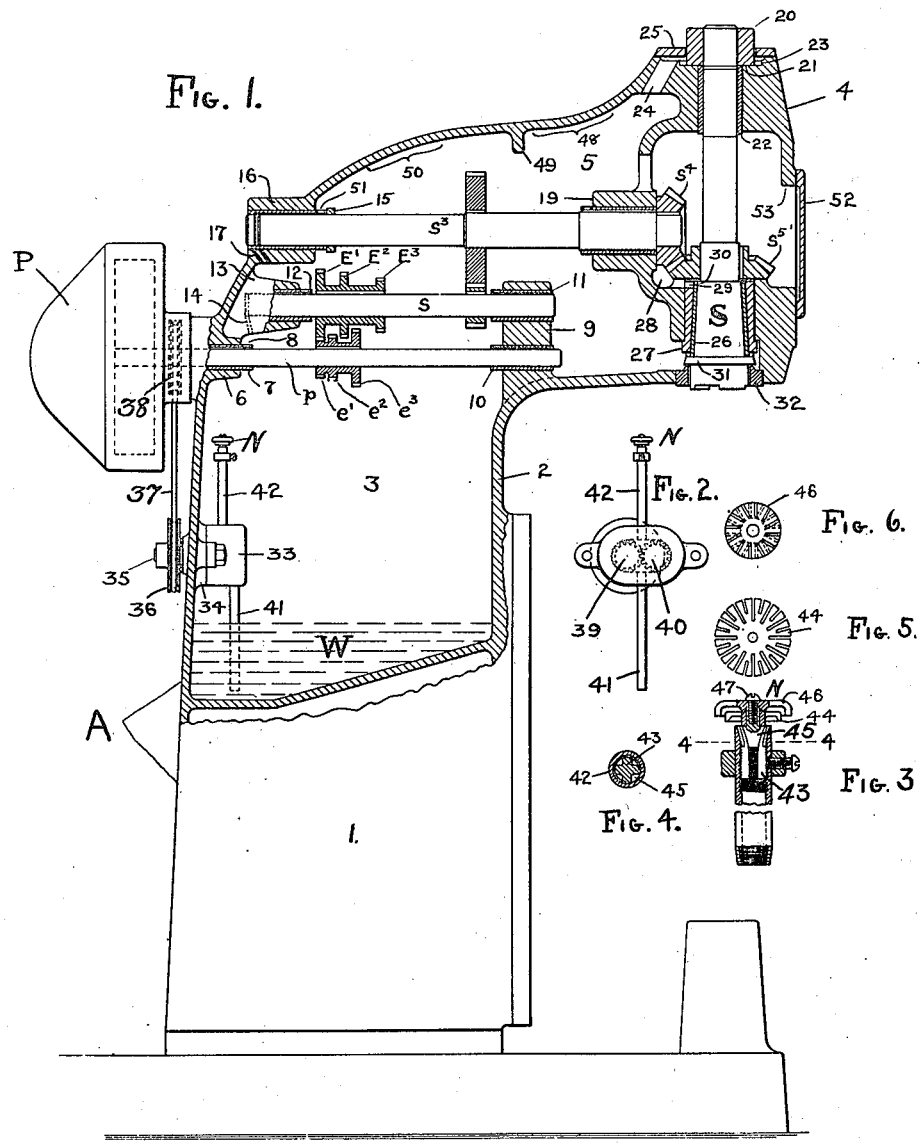

ERNEST M. CHACE, OF CINCINNATI, OHIO, ASSIGNOR TO THE CINCINNATI MILLING MACHINE CO., OF CINCINNATI, OHIO, A CORPORATION OF OHIO.

VAPOR OILING SYSTEM.

1,125,031.     Specification of Letters Patent.     Patented Jan. 12, 1915.

Application filed May 21, 1914. Serial No. 840,126.

*To all whom it may concern:*

Be it known that I, ERNEST M. CHACE, a citizen of the United States, and residing at Cincinnati, in the county of Hamilton and State of Ohio, have invented a new and Improved Vapor Oiling System, of which the following specification is a full disclosure.

This invention deals with a machine organization improved from the standpoint of the maintenance of an adequate lubrication of its various bearings; and it proposes a radical departure from the systems of so-called "stream lubrication" that depend for conveying liquid lubricant upon a multiplicity of conduits or channels establishing a definite continuity from the source of oil to the various bearings.

Heretofore, various systems of so-called "stream lubrication" have been proposed, but they have possessed disadvantages from two standpoints. First; the construction has necessarily been rather expensive by reason of the more or less complex arrangement of pipes and interconnecting channels; thereby increasing the cost of manufacture. Second; such systems have unavoidably involved elements or unreliability by reason of the prospect that one or more of the pipes would sooner or later become obstructed and thus deprive the bearings dependent upon it of an adequate supply of oil.

Among other things, this invention contemplates an arrangement whereby the oil in the form of a vapor or mist, instead of being conveyed entirely along the conventional restricted lines of travel inherent in stream-lubrication systems, will now be unrestrictedly enabled to approach or envelop the bearings from a multiplicity of directions, and in lines of travel not necessarily dependent upon the preservation of continuity by means of pipes, and the like. By this invention there is thus created an essentially universal and quite reliable system of lubrication.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation of a milling machine of the overarm type; parts being broken away to show the internal construction thereof. Fig. 2 is a side elevation of a simple construction typifying an atomizing means such as may be contemplated by this invention. Fig. 3 is a vertical longitudinal section through the atomizing nipple. Fig. 4 is a horizontal section through line 4—4 of Fig. 3. Fig. 5 is a plan of a spin-wheel forming a part of this nipple and Fig. 6 is a plan of a multiple blade baffle that coöperates with the spin-wheel.

Continuing now by way of a more detailed description, A designates a frame for mounting various running elements; being instanced in this instance as the frame of a vertical spindle milling machine. This frame is provided with a base portion 1 that serves as a foundation for the machine-tool, and a closed portion 2 constituting a casing provided with a chamber 3 within which may be located the various bearings, journals and gears of operative mechanism, such as that constituting the transmission and speed-change mechanism operating the spindle or the table of a milling machine or other type of machine-tool. In this instance, this frame is formed to provide an overarm 4, which, preferably, extends integrally from the casing portions 2 and provides an overarm chamber 5 that merges with the chamber 3 aforesaid.

A prime-mover P is journaled on the frame at any appropriate point thereof, and it is suitably connected to a driving member $p$, here instanced as a shaft passing through and journaled in the wall of the casing and entering the chamber thereof, and at its other end journaled in the casing. That is to say, the wall of the casing is provided at 6 with a bushing-support that receives a bushing 7 having an end preferably projected clear of the wall, as shown, and providing one or more oil apertures 8 of substantial size and preferably so located and arranged with relation to the adjacent wall surfaces that the film thereof formed by surface condensation may drain down and enter aperture 8. Within the chamber, the casing may provide an extension or lug 9, which is also apertured to receive a similar bushing 10 in which is journaled the end of the shaft $p$ so that such end is entirely inclosed. A similar shaft $s$ may be arranged in parallelism with the shaft $p$ at a distance therefrom, and may be journaled at one end in the bushing 11, and at the other end in a similar bushing 12 mounted in a lug 13 that projects from the wall of the casing and which provides a drain port 14 leading from the inner end of the bushing 12, so that the end of the shaft $s$ need not be exposed to the exterior of the casing.

A speed-change mechanism may serve to transmit motion from the shaft $p$ to the shaft $s$ at the predetermined rate. Thus, keyed to the shaft $s$ may be a plurality of gears $E^1$, $E^2$ and $E^3$ and a complementary series of gears $e^1$, $e^2$ and $e^3$ may be splined to the shaft $p$ so that any two of these gears may be intermeshed by shifting the latter in a well known manner. The shaft $s^3$ may also be journaled in the frame in parallelism with the shaft $s$, as by means of the bushing 15 which is secured in the hub portion 16 of the casing; which hub is enabled to return oil to the casing by means of a duct 17. The other end of this shaft $s^3$ is journaled in a portion of the overarm formed by the weblike part 18 providing a hub 19, so as to provide space in offset relation with the spindle for a bevel gear $s^4$ secured to the end of the shaft $s^3$, and meshing with a bevel gear $s^5$ secured to the spindle S. This spindle carries a collar 20 at its upper end whereby downward movement of the spindle is restrained and this collar forms a thrust-bearing adjacent surface 21 of the overarm and the upper end of the spindle is journaled against lateral movement by means of the bushing 22. Preferably, the bearing surface 21 constitutes the bottom of a circular basin 23 which is adapted to receive oil through an enlarged uprising port 24, as will be described. A cap-plate 25 may rest over this basin so as to cover the same and exclude dust therefrom. The lower end of the spindle provides a tapered portion that fits in a tapered bushing 26 that in turn is mounted in a sleeve 27 secured to the adjacent portion of the overarm. This portion provides a drainage surface 28 from which leads a port 29 registering with a similar port 30 in a sleeve 27, thereby admitting oil to the wearing surfaces. Secured to, or formed on the lower end of the spindle may be an ordinary oil thrower 31, which in the usual manner overrides the annular ridge 32, so as to prevent oil from escaping and dripping down past the exposed end of the spindle.

The aforesaid elements and features of construction are inclosed in self contained relation with the casing and are lubricated in a unique manner. That is to say, at an appropriate point is located an oil well or reservoir, which, preferably, is formed integrally with the casing or frame, as indicated by W, and a power driven means is provided deriving oil from this well, and generating therefrom a vapor which is delivered into the inclosed chamber of the casing and enabled to extend throughout the same to envelop various wearing surfaces, permeating the bearings thereof, and condensing on the various exposed surfaces, and infiltrating into and through the journals in said chamber. The illustrated embodiment of this atomizer comprises a gear-pump 33, which is here shown located within the chamber 3, and bolted to the adjacent portion 34 of the wall, and having its operating shaft 35 projecting through said wall and carrying a pulley 36, which by means of a belt 37, is driven from a pulley 38, deriving motion from the prime-mover. Secured to shaft 35 is a gear 39 that meshes with a complementary gear 40 and thereby forms a continuously operating oil pump of well known construction. A pipe 41 communicates with the inlet part of the pump and carries oil to it from the well W, and this oil is then discharged under pressure through the pipe 42 having its end terminating within the closed casing, and carrying a suitable atomizer. This atomizer N is shown best by Fig. 3 and embodies a nipple member 43 which is screw threaded within the bore of the pipe 42, so as to be adjustable thereon, and which terminates in a stud or post forming a spindle or journal about which a spin-wheel 44 rotates. This spin-wheel is shown by Fig. 5 and it is shaped somewhat like the wheel of a turbine so that it may be rotated at a very high speed by streams of oil directed thereto. These streams pass along channels 45 formed by cutting slots in the nipple member 43, and the size of such streams or jets is regulated by giving the nipple member 43 a conical shape at the extremity of the pipe 42, as will be understood by Fig. 3. The jets of oil are directed against the spin-wheel and the latter rotates rapidly and breaks up these jets, and they are further broken by impinging against a fixed collar 46 secured by means of the screw 47, and provided with a number of small radial openings that, in coöperation with the spin-wheel, have the effect of generating a very fine mist from the oil. This mist is enabled to be carried by air currents and by its own extensibility so as to reach all portions of the casing and thus enable the various bearings to receive ample lubrication. This lubrication is derived from the mist in various ways, some of which have already been explained, or will become apparent. For example, certain portions of the interiorly exposed surfaces, for instance surface 48, will produce a film of oil by surface condensation, and this film will gravitate toward a drip ledge 49 and then drain downwardly on to an underlying bearing or bushing, or oil duct. Likewise, the film of oil produced by surface condensation along the area 50 will drain downwardly and enter the bushing 15 through the port 51. The mist will also rise through the ample port 24, and by condensing on the various surfaces with which it ultimately contacts, will supply oil for the spindle bearings. Ultimately, the condensed oil, by various ways, drains into the well W, so that the lubricating system is essentially continuous.

For the purpose of inspecting the operation of the various parts a cover plate 52 for the man hole 53 may be provided, preferably at a point in the frame remote from the atomizer, so that on observation of the extensibility of the vapor or oil mist may at any time be made and so that access may be had to the interior of the casing for the purpose of supplying oil thereto or the like.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent of the United States:

1. A self-lubricating machine-tool combining a hollow frame forming a closed casing; a power-driven shaft entering through the wall of said casing and journaled therein; a spindle emerging through the wall of said casing and journaled therein; means located and journaled within said casing for transmitting motion from said power-driven shaft to said spindle; a source of oil located within said casing; and means deriving oil from said source and delivering it in the form of a mist into the chamber of said casing, whereby it may permeate into bearings within said casing.

2. A self-lubricating mechanism combining a closed casing; a transmission system journaled within said casing; a pipe; a pump adapted to force oil under pressure through said pipe; and a nozzle mounted on the end of said pipe within said closed casing, said nozzle providing a plurality of baffle elements adapted to shatter the stream of oil and generate therefrom a fine mist capable of being carried by air currents throughout the interior of said casing.

3. A self-lubricating machine-tool combining a frame having one portion forming an inclosed casing and the other portion forming a base for the support of said frame; a prime-mover mounted on said frame; a member connected with said prime-mover and extending into said inclosing casing; an element extending through the wall of said casing; a transmission system journaled within said inclosed casing to receive motion from said member and transmit the same to said element; said casing being provided with an oil-well and being constructed to return oil condensed in its interior to said well; and means deriving power from said prime-mover and adapted to generate a mist of oil and to deliver it into the interior of said casing whereby it may extend and permeate the bearings in the interior of said casing.

4. A self-lubricating machine-tool combining a hollow frame forming a closed casing and provided with an oil-well; a power-driven shaft entering through the wall of said casing and journaled therein; a spindle emerging through the wall of said casing and journaled therein; means located within said casing for transmitting motion from said power-driven shaft to said spindle; means deriving liquid oil from said well, converting it into a mist and delivering it in that form into a chamber of said casing, whereby it may permeate into bearings within said casing; and means for enabling oil condensed within said casing to return to said well.

5. A self-lubricating system combining a closed casing providing an oil-well and constructed to drain oil thereinto and also providing a bearing in an upper portion thereof and having a large passage leading through the adjacent material of the casing to the wearing surface of said bearing; and power-driven means located remotely from said bearing and adapted to derive oil from said well and convert it into a mist capable of extending through the intervening space to said bearing and to permeate it through said enlarged passage.

6. A self-lubricating machine-tool combining a hollow frame provided with a hollow overarm; a vertical spindle journaled at the end of said overarm; a prime-mover mounted on the body portion of said frame; a transmission system journaled within said frame to receive motion from said prime-mover and transmit the same to said spindle; an atomizer within said frame; said frame forming a casing inclosing the above-mentioned parts and being provided with an oil-well and being constructed to return oil condensed in its interior to said well; and a power-driven pump adapted to force oil from said well into said atomizer under pressure whereby in escaping therefrom it will generate a mist capable of floating throughout the interior of said casing to envelop and permeate the bearings in the interior of said casing.

7. A self-lubricating machine-tool combining a hollow frame provided with an oil-receptacle and forming a closed casing; a prime-mover; a shaft power-driven thereby and entering through the wall of said casing and journaled therein; a spindle emerging through the wall of said casing and journaled therein; gearing located and journaled within said casing for transmitting motion from said power-driven shaft to said spindle; a pump deriving oil from said source; an atomizer supplied with oil by said pump and adapted to convert and deliver it in the form of a mist into the chamber of said casing, whereby it may permeate into bearings within said casing; means propelling said pump by power derived from said prime-mover; and means for returning to said receptacle oil condensed within said casing.

8. A self-lubricating system combining a closed casing having a drip-ledge and an oil-condensing surface sloping downwardly to said drip-ledge; a bearing located below said drip-ledge to receive drippings of oil therefrom; and means for generating and delivering into the interior of said casing an oil-mist capable of extending to said oil-condensing surface and forming a film of oil thereon.

9. A self-lubricating machine-tool combining a frame provided with a closed hollow-portion; a prime-mover mounted on said frame and connected with a member passing through the wall of said hollow-portion; an element extending outwardly through the wall of said hollow-portion; a transmission system journaled within said hollow-portion to receive motion from said member and transmit the same to said element; an atomizer arranged in accessible relation with the interior of said hollow-portion; said frame being provided with an oil-well and being constructed to return oil condensed in the interior of said hollow-portion to said well; and power-driven means enabling said atomizer to derive oil from said well and deliver it in the form of a mist into the interior of said closed hollow-portion, whereby it may extend and permeate the bearings in the interior of said casing.

10. A self-lubricating machine-tool combining a hollow frame constituting a closed casing formed with an oil-well in its lower portion; a power-driven shaft entering through the wall of said casing and journaled therein; a member emerging through the wall of said casing and journaled therein; means located and journaled within said casing for transmitting motion from said power-driven shaft to said member; an oil-atomizer located within said casing and deriving oil from said source and projecting it in the form of a mist into said casing, whereby it may permeate into bearings within said casing, said casing being constructed and arranged to drain excess condensed oil into said oil-well.

11. A self-lubricating system combining a closed casing having an opening in a wall-portion thereof adapted to receive a bushing; a bushing secured in said opening and having one end projecting clear of said casing into the interior thereof and having a perforation through the exposed end-portion; a journal arranged in said bushing and adapted to receive lubricant through said perforation, and means for generating and delivering an oil-mist into said closed casing whereby it may find access to said journal through said aperture.

12. A self-lubricating machine-tool combining a hollow frame provided with a hollow overarm; a vertical spindle journaled at the end of said overarm; a prime-mover mounted on the body-portion of said frame; a transmission system journaled within said frame to receive motion from said prime-mover and to transmit the same to said spindle; an atomizer within said frame; said frame forming a casing inclosing the above mentioned parts, and being provided with an oil-well and being constructed to return oil condensed in its interior to said well; and power-driven means enabling said atomizer to derive oil from said well and deliver it in the form of a mist into the interior of said casing whereby it may extend therein and permeate the bearings in the interior of said casing.

In witness whereof, I hereunto subscribe my name, as attested by the two subscribing witnesses.

ERNEST M. CHACE.

Witnesses:
   PAUL D. STOFFORD,
   SOL EINSTEIN.